(12) United States Patent
Cook et al.

(10) Patent No.: US 9,332,316 B2
(45) Date of Patent: May 3, 2016

(54) ELECTRONIC PROGRAM GUIDE DATA ENCODING METHOD AND SYSTEM

(75) Inventors: Francis Cook, Wimbledon (GB); Matthew Frederick Barrett, Earls Court (GB); Harald Roland Malming, Surrey (GB); Nicholas John Green, Wellington (NZ)

(73) Assignee: LIBERTY GLOBAL EUROPE HOLDING B.V. (NL)

( * ) Notice: Subject to any disclaimer, the term of this patent is extended or adjusted under 35 U.S.C. 154(b) by 0 days.

(21) Appl. No.: 13/701,178

(22) PCT Filed: May 25, 2011

(86) PCT No.: PCT/NL2011/050357
§ 371 (c)(1),
(2), (4) Date: Dec. 16, 2013

(87) PCT Pub. No.: WO2011/152712
PCT Pub. Date: Dec. 8, 2011

(65) Prior Publication Data
US 2014/0165101 A1    Jun. 12, 2014

(30) Foreign Application Priority Data

Jun. 1, 2010 (EP) ..................................... 10164593

(51) Int. Cl.
*G06F 3/00* (2006.01)
*G06F 13/00* (2006.01)
(Continued)

(52) U.S. Cl.
CPC ......... *H04N 21/482* (2013.01); *H04N 5/44543* (2013.01); *H04N 21/235* (2013.01); *H04N 21/2665* (2013.01); *H04N 21/26283* (2013.01); *H04N 21/435* (2013.01); *H04N 21/84* (2013.01)

(58) Field of Classification Search
USPC .......................................................... 725/39
See application file for complete search history.

(56) References Cited

U.S. PATENT DOCUMENTS

2005/0210145 A1* 9/2005 Kim .................. G06F 17/30849
                                                          709/231
2006/0064716 A1* 3/2006 Sull ................... G06F 17/30793
                                                          725/37

(Continued)

FOREIGN PATENT DOCUMENTS

EP           2073495 A1       6/2009

OTHER PUBLICATIONS

European Telecommunications Standards Institute (ETSI): "ETSI TS 102 822-2 V1.4.1: Broadcast and On-line Services: Search, select, and rightful use of content on personal storage systems ("TV-Anytime"); Part 2: Phase 1—System description", Nov. 2007, 127 pp.

(Continued)

*Primary Examiner* — Pinkal R Chokshi
*Assistant Examiner* — Alexander Gee
(74) *Attorney, Agent, or Firm* — Volpe and Koenig, P.C.

(57) ABSTRACT

A method for composing an electronic program guide (EPG) metadata file, comprising receiving program metadata and converting the program metadata into a file using a Fast Infoset coding standard. The method is applied in a Metadata search server (MSS) for providing services relating to an electronic program guide (EPG), the MSS (1) in operation being in communication with a plurality of set top boxes (3), and one or more metadata providers (11, 12) which provide program metadata. The MSS (1) comprises an encoder (15) arranged to encode program metadata received from the one or more metadata provides (11, 12) into an EPG file to be broadcast using fast infoset (FI) standard.

7 Claims, 1 Drawing Sheet

(51) Int. Cl.
*H04N 5/445* (2011.01)
*H04N 21/482* (2011.01)
*H04N 21/235* (2011.01)
*H04N 21/2665* (2011.01)
*H04N 21/435* (2011.01)
*H04N 21/262* (2011.01)
*H04N 21/84* (2011.01)

(56) References Cited

U.S. PATENT DOCUMENTS

2006/0122986 A1    6/2006  Sohma
2009/0064218 A1*   3/2009  Yamagishi ....... H04N 21/41407
                                                        725/25
2009/0193483 A1    7/2009  Hwang et al.
2010/0287460 A1*  11/2010  Denoual et al. ................ 715/234
2011/0270895 A1*  11/2011  Shelby ................ G06F 17/2252
                                                        707/803

OTHER PUBLICATIONS

Binary XML, Apr. 2, 2010, 2 pp.

Arthur Miskolczi, "Diplomarbeit Thema: Reduktion von Speicherbedarf und Transfervolumen in mobilen Anwendungen durch komprimiertes XML", Aug. 18, 2005, 65 pp.

* cited by examiner

ELECTRONIC PROGRAM GUIDE DATA ENCODING METHOD AND SYSTEM

This application is a 35 U.S.C. §371 national phase application of PCT/NL2011/050357, which was filed May 25, 2011 and is incorporated herein by reference as if fully set forth.

FIELD OF THE INVENTION

The present invention relates to a method for encoding electronic program guide data to be transmitted in both a one-way and a two-way broadcast network.

BACKGROUND OF THE INVENTION

In present day television broadcast systems, often use is made of electronic program guides (EPG), which provide to a user information concerning TV programs. EPG-data is transmitted together with TV-signals, nowadays more and more in the form of digital communication.

EPG's or EPG applications in general are designed to allow a user to watch television programs whilst browsing available channel and program information, e.g. for up to eight days ahead. This information can be presented in a multi-channel grid view or a single channel list view on a television screen. The application will allow (where hardware and middleware permits) the setting of reminder memos, recording memos and ongoing recordings for a series of related programmes. Other functionality may include locking/unlocking of channels, setting/unsetting of favourites and signalling of specific channel and program properties (e.g. HD or copy protection).

TV Anytime (TVA) is an ETSI standard for describing TV related broadcast, scheduled and on-demand content, and is used to transfer EPG related data. Despite the formulation of this standard, implementation details are left to the institutions using the standard. TV Anytime is used as an end-to-end metadata model for transferring data from potential 3rd parties, such as listings providers or other metadata providers (for example on- demand content), into back-end systems of service providers, such as cable operators, all the way through to a set top box (STB) in a consumer's premises in an auditable fashion. The data model associated with TVA is extensive enough to cope with information introduced at a source and can be propagated all the way through to the STB.

Sections 6.2 and 6.7, page 37, paragraph 5 of the prior art document from ETSI "ETSI TS 102 822-2 V1.4.1: Broadcast and On-line Services: Search select and rightful use of content on personal storage systems ("TV Anytime"); Part 2, Phase 1—System description", discloses that binary encoding of XML data using the BiM standard is used in order to save transmission bandwidth. Also it is indicated that the use of alternative binary encoding schemes may be possible, but none are specifically mentioned.

SUMMARY OF THE INVENTION

The present invention seeks to provide a more efficient transfer of data relating to electronic program guide (EPG) systems.

In a first aspect, according to an aspect there is provided a method according to the preamble, in which action converting the program metadata into a file using a Fast Infoset coding standard. By using the Fast Infoset coding standard, the data payload size of the converted file is roughly half of that of the program metadata payload, which will also result in a lower number of Ethernet data packets that need to be transmitted.

It is noted that prior art document US2005/210145 discloses that in order to overcome the bandwidth problem, TV-Anytime provides a compression/encoding mechanism, e.g. BiM, an efficient binary encoding format for XML adopted by MPEG-7. Furthermore, this document indicates that the BiM encoding/decoding scheme comprises a "Zlib" compression step. Therefore, it is clear that using BiM scheme in TV-Anytime only saves the transmission bandwidth with the cost of relatively low processing performance and may consume relatively more power for decoding in the STB side due to the relatively high compression rate. It is then difficult to implement the BiM scheme on constrained devices in view of the relatively high power consumption. The present invention does provide for an alternative encoding/decoding scheme, while still maintaining acceptable performance on the limited processing power of a set top box.

In an embodiment, the program metadata is in a TV Anytime format. This embodiment provides the advantage that pairing of the TV Anytime format and Fast Infoset coding standard has enabled a robust encoding for the auditable propagation of TV metadata end-to-end while still maintaining acceptable performance on the limited processing power of the STB.

In a further aspect, the present invention relates to a metadata search server (MSS) for providing services relating to an electronic program guide, the MSS in operation being in communication with a third party unit and one or more terminals, wherein the MSS comprises an encoder arranged to encode program metadata into an EPG file to be broadcast using a fast infoset (FI) standard.

In an even further aspect, the present invention relates to a set top box for receiving program related data including an electronic program guide for display on a display unit, the set top box being arranged to be in communication with a metadata search server according to one of the invention embodiments, the set top box further comprising a decoder to convert the data comprised in the EPG file for display on the display unit.

In a further embodiment, the set top box is further arranged to receive a selection from a user, and to send the selection to a metadata server.

A computer program product is described in an even further aspect of the present invention, comprising computer executable instructions, which when loaded on a computer system, provide the computer system with the functionality of the present invention method embodiments.

The fast infoset (FI) standard is an international standard that specifies a binary encoding format for the XML Information Set (XML Infoset) as an alternative to the XML document format. It is defined by both the ITU-T and the ISO standards bodies. FI is officially named ITU-T Rec. X.891 and ISO/IEC 24824-1 (Fast Infoset), respectively.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show.

DETAILED DESCRIPTION OF EMBODIMENTS

Figure 1:
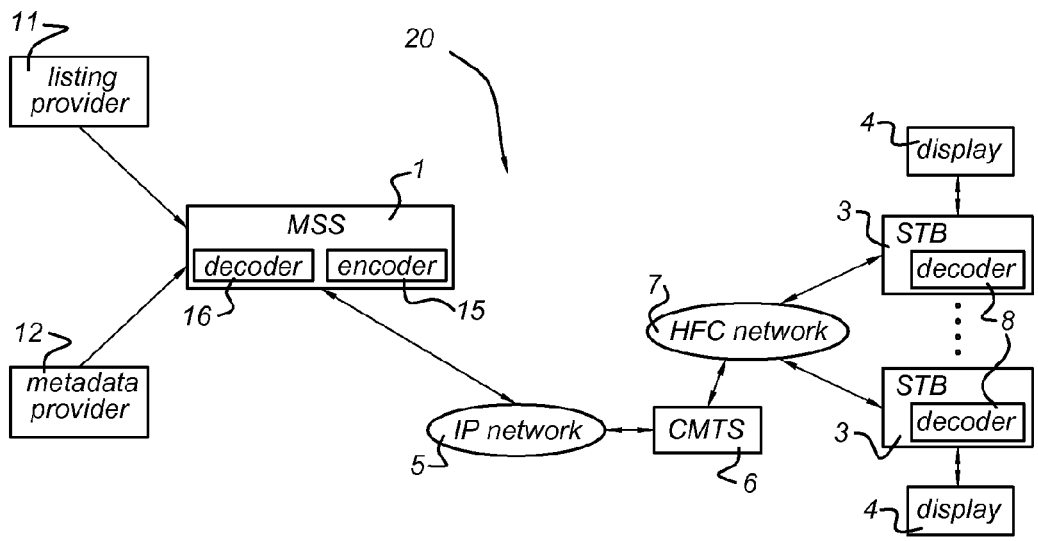
FIG. 1 shows a simplified schematic diagram of one embodiment of invention.

In present day television broadcast systems, often use is made of electronic program guides (EPG), which provide to a user information concerning TV programs. EPG-data is transmitted together with TV-signals, nowadays more and more in the form of digital communication. The TV Anytime (TVA) standard may be used as an end-to-end metadata model for transferring data from potential $3^{rd}$ parties into back-end systems all the way through to a set top box (STB) in an auditable fashion i.e. the data model is extensive enough to cope with information introduced at source and be propagated all the way through to the STB. The simplest method of ensuring end-to-end traceability of the metadata within the TVA model was to use the default extensible markup language (XML) structure specified by the standard. However, tests have indicated that the performance of this technology for retrieving metadata on legacy STB hardware was too slow to compete with traditional formats and methods currently used for broadcast delivery of metadata.

Furthermore, an encoding format is applied that is optimised for processing without string matching. According to the present invention embodiments an encoding standard for XML is used that optimises for processing and size on embedded devices such as an STB which provides further performance advantages.

The further performance advanced encoding standard is referred to as Fast Infoset (FI) and the specification is defined by both the ITU-T and the ISO standards bodies. FI is officially named ITU-T Rec. X.891 and ISO/IEC 24824-1 (Fast Infoset), respectively. FI is an international standard that specifies a binary encoding format for the XML Information Set (XML Infoset) as an alternative to the XML document format. It aims to provide more efficient serialization than the text-based XML format and optimise its processing on low-CPU devices such as STBs, mobiles, etc. as well as compressing the overall payload to provide further performance advantages.

Pairing of the TVA specification and Fast Infoset has enabled a robust encoding for the auditable propagation of TV metadata end-to-end while still maintaining acceptable performance on the limited processing power of the STB. The combination of these two standards originating from diverse technology segments, namely broadcast TV and service-orientated, enterprise architecture have been combined with positive results and is unique.

FI can be understood as a compressing standard such as gzip for XML, though FI aims to optimize both document size and processing performance, whereas compressing standard such as gzip optimizes only the size. While the original whitespace formatting of XML document may not be completely maintained, from the perspective of an XML parser the encoding is completely lossless. Hence, the encoding method is transparent to the XML metadata, i.e. the TVA structure is fully preserved. The encoding method is implemented in a metadata search server MSS 1 (see description of FIG. 1 below) which encodes variable-size scheduled metadata into files using the FI coding standard dimensioned by time and channels. The decoding method is implemented in a set top box STB 3 (and optionally in the MSS 1), which decodes files using the FI coding standard dimensioned by time and channels.

In FIG. 1, a simplified schematic diagram of one embodiment 20 of invention is shown, in which the hardware/software entities, related structures and data flow are exemplified. A major element in this set-up is the metadata search server (MSS) 1. The MSS 1 receives and collects data relating to available programs metadata from third party units such as a listing provider 11 which provides listing and search information as program metadata, and/or metadata provider 12 which provides other program related metadata. The MSS 1 comprises an encoder 15 which encodes program metadata into a file using a Fast Infoset coding standard for broadcast to STB's 3.

Furthermore, the MSS 1 comprises a decoder 16 which may optionally decode data received from the STB 3 (e.g. control or selection data) using the Fast Infoset coding standard. The decoder 16 is arranged to decode data received from one of the plurality of STB's 3. As an alternative the data from the STB 3 can be sent unencoded to the MSS 1 where no inherent advantage is achieved due to the simplistic format and payload size of the message.

The encoder 15 and/or decoder 16 may be implemented either by software or by hardware or any combination thereof At the other end of the system shown in FIG. 1, a plurality of set top boxes (STB) 3 are present, which are located remote from the MSS 1, e.g. in consumer's premises, and each connected to a display unit 4, such as a television set. The STB 3 provides functionalities in order to allow a user of the STB 3 to make selections of channel etc. for viewing, and to display an electronic program guide (EPG) on the display unit 4. The STB 3 may comprise a decoder 8 which decodes an EPG file received from the MSS 1. The decoder 8 may be implemented either by software or by hardware or any combination thereof The connection between the MSS 1 and the STB 3 is via a transmission network 5 (e.g. an IP network), which allows to transfer data in both directions. Most data will be transferred downstream (to the STB 3), but it is possible to transfer data upstream (i.e. from STB 3 to MSS 1), which allows enhanced user interaction, e.g. for making personalised selections.

In the exemplary embodiment shown in FIG. 1, the MSS 1 connects to an IP network 5, to which also a cable modem termination system (CMTS) 6 is connected. The CMTS 6 and the STB 3 are connected to each other via a hybrid fibre-coaxial (HFC) network 7, which is readily available in most rural areas. Of course, other types of network connections may be used, such as an all IP network 5. The metadata server MSS 1 as shown in the embodiment of FIG. 1 is a focal point for all the metadata associated with any content eventually available to the consumer via STB 3.

In the downstream data transferring procedure, the present embodiment of invention provides a solution for providing basic now and next information as well as TV Schedule Listings for Electronic Programme Guides (EPG) to be shown on the display unit 4 using the STB 3. The whole data flow follows several sequences listed below:

1. The third party units such as the listing provider 11 and metadata provider 12 send the program metadata to the MSS 1. Possibly, the program metadata is processed using the TVAnytime standard to obtain an XML file.

2. The encoder 15 of MSS 1 encodes the program metadata into a file using FI coding standard.

3. The MSS 1 sends the encoded file to one or more of the STB 3 via transmission network 5, 6, 7.

4. The STB 3 can either directly interpret FI data to build an EPG page for display on display unit 4, or first convert the FI data into XML via the decoder 8 of the STB 3 and then interpret the XML data to build an EPG page, in order to display the EPG page on the display unit 4.

In the upstream data transferring procedure, the present embodiment of invention provides a solution for providing an enhanced user interaction for user to select one or more programs metadata from the third party units and send the selection requests and control playback information to the third party units. The whole data flows follow several sequences listed below:

The STB 3 sends the requests and control playback information either unencoded or in the format of FI coding standard from the STB 3 to the MSS 1 via the transmission network 5, 6, 7.

If applicable the decoder 16 of the MSS 1 decodes the file using FI coding standard received from STB 3 into control data.

The MSS 1 uses the unencoded or decoded control data in accordance with the request from the consumer.

Figure 2:
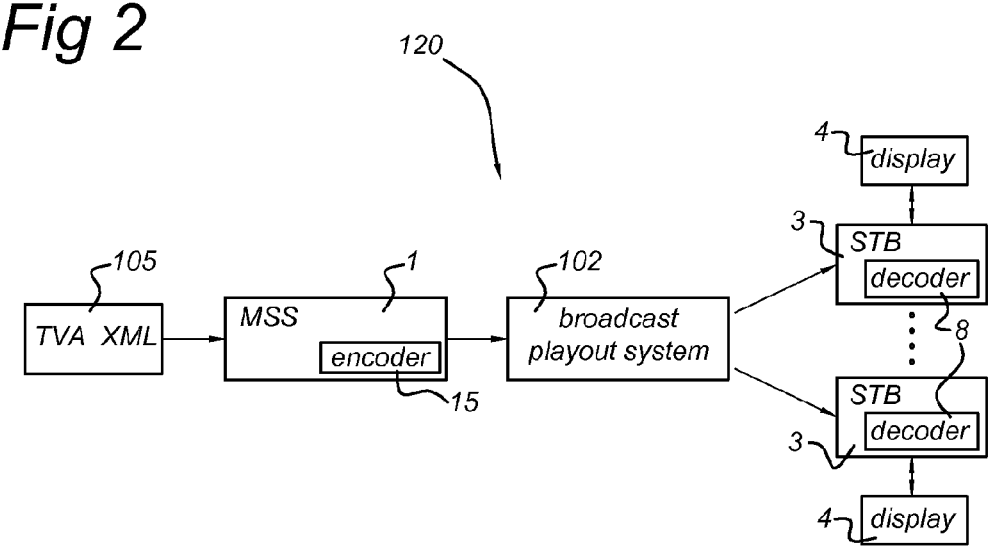
FIG. 2 shows a simplified schematic diagram of a further embodiment of invention.

FIG. 2 shows a simplified schematic diagram of a further embodiment 120 of invention, in which the hardware/software entities, related structures and data flow are exemplified. A major element in this set-up is again the metadata search server (MSS) 1, which receives and collects program metadata 105, e.g. in the form of TVAnytime encoded XML data. The MSS 1 comprises an encoder 15 which encodes the TVAnytime metadata into a FI data structure. The encoder 15 may be implemented either by software or by hardware or any combination thereof At the other end of the system shown in FIG. 2, a plurality of set top boxes (STB) 3 are present, which are located remote from the MSS 1, e.g. in consumer's premises, and connected to display units 4, such as television sets. The STB 3 provides functionality in order to allow a user of the STB 3 to make selections of channel etc. for viewing, and to display an electronic program guide (EPG) on the display unit 4. The STB 3 comprises a decoder 8 which decodes the data received in the EPG file for display on display unit 4. The decoder 8 may be implemented either by software or by hardware or any combination thereof The connection between the MSS 1 and the STB's 3 in this embodiment is provided via a one way broadcast playout system 102, which allows to transfer data in only one directions, i.e. from the MSS 1 to the STB's 3.

The whole data flows of embodiment shown in FIG. 2 follows several sequences listed below:

The program metadata 105 is sent to the MSS 1.

The encoder 15 of MSS 1 encodes the program metadata 105 into an EPG file to be broadcast using fast infoset (FI) standard.

The MSS 1 sends the encoded EPG file to one of the STB's 3.

The STB 3 can either directly interpret the received FI data to build an EPG page for display on display unit 4, or first convert the file using FI coding standard into XML data (using e.g. also the decoder 8 of STB 3) and interpret the XML data to build the EPG page, in order to display the EPG page on the display unit 4.

Experiments have been conducted to be able to assess the advantages of the present invention embodiments. The experiments have proven that initial timings of FI encoding format show on average an eight-fold improvement in processing of Fast Infoset metadata as opposed to other XML parsing methods on the STB 3. The data payload size is roughly half of that of the TVAnytime XML payload, which will also result in a lower number of Ethernet data packets that need to be transmitted by the MSS 1 and to be processed by the STB 3, which provides further advantages. Also the entire encoding/decoding process using the FI standard is fully transparent, at any time in the flow of data, the original TVAnytime model is preserved and can be retrieved.

Aspects of the present invention may be implemented with a distributed computer system operating environment, together providing e.g. the functionality of the MSS 1. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Some of the invention embodiments have been described above in the general context of computer executable instructions, such as program modules, that are executed by a processing device, which is part of the MSS 1 or the STB 3. Generally, program modules include routines, programs, objects, components, data structure definitions and instances, etc, that perform particular tasks or implement particular abstract data types. Typically the functionality of the program modules may be combined or distributed as desired in various environment.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a computer system (e.g. a general purpose computer, special purpose computer, or special purpose processing device) to perform a certain function or group of functions.

The present invention has been described above using a detailed description of embodiments, with reference to the attached drawings. In these embodiments, elements may be replaced by equivalent elements providing a similar functionality. The scope of the invention is determined by the language of the claims as attached and its equivalents. The used reference signs are referring to the embodiments described above and are not intended to limit the scope of the claims in any manner.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A method for composing an electronic program guide (EPG) metadata file, comprising:
sending third party program metadata in TV Anytime format from a metadata provider to a metadata search server;

encoding, at the metadata search server, the TV Anytime program metadata into an electronic program guide (EPG) file by pairing the TV Anytime format with a Fast Infoset encoding format;

sending the Fast Infoset encoded EPG file from the metadata search server to a consumer premises device over a transmission network;

decoding, at the consumer premises device, the Fast Infoset encoded EPG file for presentation of EPG data to a consumer;

encoding, at the consumer premises device, selection requests from the consumer using the Fast Infoset encoding format;

sending the Fast Infoset encoded selection requests to the metadata search server over the transmission network for further processing.

2. The method of claim 1, further comprising sending the EPG file for reception by one or more set top boxes.

3. The method of claim 1, wherein said program metadata is in a XML format.

4. A metadata search server (MSS) for providing services relating to an electronic program guide (EPG), the MSS in operation being in communication with a plurality of set top boxes, and one or more metadata providers which provide program metadata, wherein the MSS comprises an encoder arranged to encode program metadata in a TV Anytime format received from the one or more metadata providers into an EPG file by pairing the TV Anytime format with a Fast Infoset encoding format;

wherein said MSS further comprises a decoder arranged to decode Fast Infoset encoded data received from one of the plurality of set top boxes.

5. The metadata search server of claim 4, wherein the MSS is further arranged to send the EPG file in TV Anytime format upon request from one of the plurality of set top boxes.

6. A set top box for receiving program related data including an electronic program guide (EPG) for display on a display unit, the set top box being arranged to be in communication with the metadata search server of claim 5, to receive a Fast Infoset encoded EPG file comprising a pairing of a TV Anytime format and a Fast Infoset encoding format, the set top box further comprising a decoder to convert the data comprised in the EPG file for display on the display unit, the set top box being further arranged to receive a selection from a user, and to send the selection to the metadata server using the Fast Infoset encoding standard.

7. A non-transitory computer program product comprising computer executable instructions, which when loaded on a computer system, allows the computer system to compose an electronic program guide (EPG) metadata file by:

sending third party program metadata in TV Anytime format from a metadata provider to a metadata search server;

encoding, at the metadata search server, the TV Anytime program metadata into an electronic program guide (EPG) file by pairing the TV Anytime format with a Fast Infoset encoding format;

sending the Fast Infoset encoded EPG file from the metadata search server to a consumer premises device over a transmission network;

decoding, at the consumer premises device, the Fast Infoset encoded EPG file for presentation of EPG data to a consumer;

encoding, at the consumer premises device, selection requests from the consumer using the Fast Infoset encoding format;

sending the Fast Infoset encoded selection requests to the metadata search server over the transmission network for further processing.

* * * * *